INVENTOR.
ARDEN J. WOLTERMAN

BY Norman R. Bardales
ATTORNEY

United States Patent Office 3,541,533
Patented Nov. 17, 1970

3,541,533
GATE CIRCUIT AND SYSTEM

Arden J. Wolterman, Apalachin, N.Y., assignor to International Business Machines Corporation, Armonk, N.Y., a corporation of New York Filed Nov. 29, 1967, Ser. No. 686,651
Int. Cl. G11c 7/00, 11/14; H03k 3/33
U.S. Cl. 340—174 47 Claims

ABSTRACT OF THE DISCLOSURE

A gate circuit which employs two transistor switching elements and a charge storage diode. The diode is connected between the output and a reference source. The circuit is controlled by two control signals. During their coincident application, the diode is allowed to accumulate charge carriers through one of the transistors. The charge carriers provide a low impedance path between the load, which is connected to the output, and the source. Removal of the charge carriers is through the other transistor and/or load.

BACKGROUND OF THE INVENTION

This invention relates to a gate circuit and gate system.

It is well known to those skilled in the art, that in making a connection between a signal source or generator and a predetermined load, it is generally desirable that the connecting means have a low impedance so that a high fidelity input signal is applied to the load. By way of example, in a known magnetic memory system which utilizes a memory array employing thin magnetic film elements and which is organized on a word line basis, the word lines are connected to a direct drive matrix system of the diode type. More particularly, each diode of the matrix is serially connected to one of the word lines of the memory. At each of the intersections of each of the $x$ and $y$ selection lines of the direct drive matrix one of the aforedescribed series connected circuits is shunted across the particular $x$ selection line and $y$ selection line associated with the intersection. Selectable current sources are connected to the selection lines of one of the $x$ and $y$ selection lines sets, e.g. the $y$ set, and selectable current sinks are connected to the selection lines of the other set, e.g. the $x$ set. By selection of a particular current source and current sink, the diode of the matrix associated with the intersection of the corresponding $x$ and $y$ selection lines to which the selected current driver and selected current sink are connected is forward biased and results in the associated memory word line being driven by a current signal from the current driver. Word organized memory systems are generally known in the art. An example of a memory system of this type is described in a co-pending application of the same assignee herein and is entitled "High Speed Memory Device with Improved Read-Store Circuits," A. W. Vinal, filed May 1, 1967, Ser. No. 635,072 and now U.S. Pat. No. 3,487,372.

Heretofore, each of the current sources in the known system employed a transistorized gate for connecting a reference source to the corresponding memory word line. More particularly, the output of a switching transistor was connected between a selection line and a reference source which generally was the bias supply of the transistor and which provided the current signal for the memory word line. Because of the particular current requirements necessary to drive the memory word line and its associated diode and current sink, the current handling capacity of the transistor was quite large, and resulted in a large voltage drop and corresponding power dissipation across the high impedance output of the switching transistor. Conseqcently, the switching transistor of the known current source were expensive heavy duty types. Another disadvantage was that the transistor's high impedance adversely affected the rise time of the current signal it was passing. This resulted in a decrease of the reading and writing time of the associated memory system and/or provided a source of array noise. Moreover, because of the physical size of the transistor, it was not possible to mount the reference source and transistor in close proximity to the corresponding selection line. Consequently, the current drivers were packaged and mounted at remote positions from the site of the diode matrix and magnetic memory array. This increased the impedance between the source and memory word line and caused further power dissipation to be encountered in the connecting lines between the remote current drivers and the direct diode matrix and magnetic memory array. The increased inductance of the longer connecting lines and the resultant transient effects produced thereby also adversely affected the quality of the current driver signal. Consequently, there was a definite need for an improved current driver circuit to mitigate and/or eliminate the aforedescribed disadvantages of the transistor gate of the known driver circuit.

SUMMARY OF THE INVENTION

It is an object of this invention to provide a gate circuit which connects a reference source to a predetermined load through a low impedance connection.

It is another object of this invention to provide a gate system of the aforedescribed type which substantially mitigates voltage drop across and/or power dissipation in the aforementioned low impedance connection.

Another object of this invention is to provide a gate circuit of the aforedescribed type which provides an improved rise time in the signal being passed from the reference source to the load.

Still another object of this invention is to provide a gate circuit of the aforementioned type which provides a current driver signal and/or a voltage driver signal from the reference source to the load.

Still another object of this invention is to provide a gate circuit of the aforementioned type to a load having selectable high and low impedance characteristics.

Still another object of this invention is to provide a gate circuit system for generating current driver signals for a magnetic memory system.

Still another object of this invention is to provide a gate circuit system for generating current driver signals for a magnetic memory system organized on a word basis and/or a memory system employing thin film magnetic storage elements.

Still another object of this invention is to provide a gate circuit system of the selection matrix type.

Accordingly, a feature of this invention is the provision of gate circuit apparatus for connecting a reference source to a predetermined load. The gate circuit apparatus comprises a charge storage diode means which is coupled between the reference source and the load. Also provided is a selectable control means for controlling the charge storage diode means. The control means, when selected, forward biases the diode means and passes current in a forward direction through the diode means. As a result, the diode means accmumulates charge carriers. The reference source is thus coupled to the load through the low impedance path provided by the accumulated charge carriers and as long as there are stored carriers available in the diode means, even if the current through the diode means should be subsequently reversed, and/or terminated, the low impedance connection is provided.

According to another feature of the invention, a gate circuit system is provided which selectively addresses at least one set of selection lines of a magnetic memory system and includes, in combination, a plurality of gate circuits, each of which has a storage diode means connected between a reference source and one of the selection lines and selectable control means for controlling the charge storage diode means. When the control means of a particular gate circuit is selected, it forward biases and passes current through the diode means in a forward direction and the diode means accumulates charge carriers. The associated reference source is thus coupled to the particular selection line through the low impedance path or connection provided by the accumulated charge carriers. The selection line circuit has selectable high and low impedance characteristics and when the selection line circuit is in its low impedance characteristic, the associated reference source of the particular gate circuit provides a current driver signal through the low impedance accumulated charge carriers to the selected low impedance line.

Another feature of the invention is a gate circuit system having a plurality of gate circuits wherein the gate circuits are arranged in a predetermined matrix or array. Each gate circuit includes a charge storage diode means coupled between a reference source and a mutually exclusive predetermined load. Also provided is a selectable means for controlling the charge storage diode means of the gate circuit. The control means selectively forward biases and passes current through the diode means in a forward direction and the diode means accumulates charge carriers. The reference source is thus coupled to the load, which is connected to the particular gate circuit of the matrix, through the low impedance path or connection provided by the accumulated charge carriers and even if the current through the diode means should subsequently be reversed and/or terminated the charge carriers, if available, will continue to provide the low impedance connection between the reference source and the particular associated load.

The foregoing and other objects, features and advantages of the invention will be apparent from the following more particular description of the preferred embodiments of the invention as illustrated in the accompanying drawing.

BRIEF DESCRIPTION OF THE DRAWING

In the figures, like elements are designated with similar reference numerals.

DESCRIPTION OF THE PREFERRED EMBODIMENTS

For purposes of explanation, the preferred embodiment of the novel gate circuit of the present invention will be described first herein and then embodiments of the gate system of the present invention will next be described.

Figure 1:
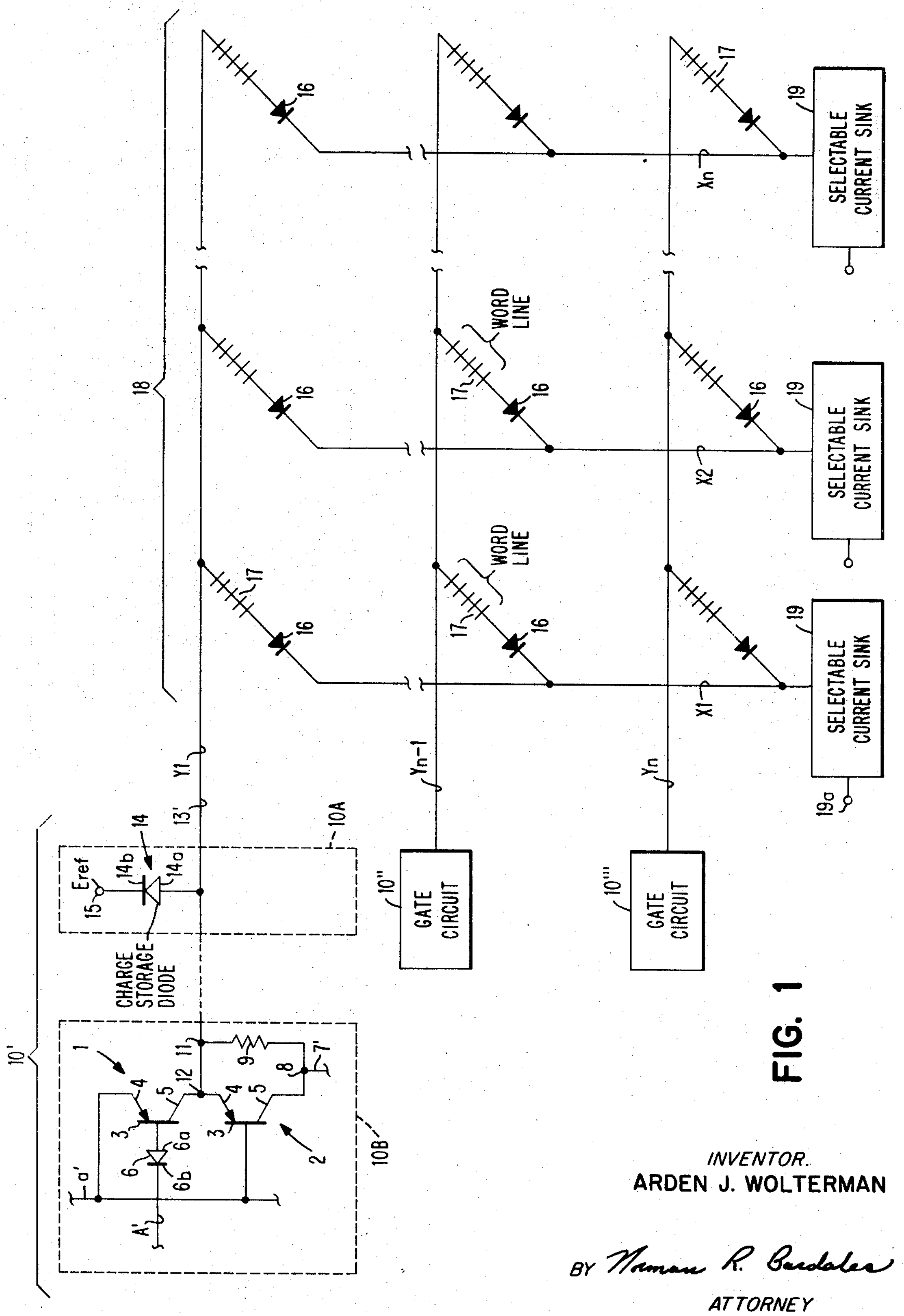
FIG. 1 is a schematic view of a preferred embodiment of the gate circuit and of the gate system of the invention.

Referring now to FIG. 1, the preferred embodiment of the gate circuit of the present invention is shown in detail and generally indicated by the reference numeral 10'. The gate circuit includes a control means or circuit part 10B which preferably provides a pair of switching amplifiers and each of which is preferably of a three terminal switching amplifier type having a control terminal and two output terminals. More particularly, the switching amplifiers are preferably of the semiconductor type which employ first and second identical conductivity type transistor switching amplifiers 1, 2, and which in turn preferably employ PNP conductivity types for the transistors 1, 2 as shown schematically in FIG. 1. For sake of simplicity, the respective bases 3, emitters 4, and collectors 5 of transistors 1, 2 are designated with the same reference characters in FIG. 1. The emitter 4 of transistor 1 and base 3 of transistor 2 are commonly connected through a common control input, not shown, hereinafter sometimes referred to as input No. 1 and which is connected to the upper end of conductor *a'*, partially shown.

Another control input, not shown, hereinafter sometimes referred to as input No. 2, is provided for controlling the base 3 of transistor 1 via the conductor A', partially shown. In those cases where it is desired to protect the base-emitter junction of transistor 1 from breakdown due to surges on conductor A' when transistor 1 is in a turned-off condition, a conventional high speed semiconductor PN junction diode 6 may be provided with its anode 6*a* connected to the base of transistor 1 and its cathode 6*b* connected to control input No. 2, not shown. A bias supply, not shown, provides a voltage level Vc to a bias input, not shown, which is connected by conductor 7' to the junction 8 of the bias resistor 9 and collector 5 of transistor 2. Additional biasing means, not shown, are also provided at the aforementioned control inputs Nos. 1 and 2. For the PNP conductivity type transistors 1, 2 of the preferred circuit embodiment, the voltage level provided by the aforementioned biasing means, not shown, at the control input No. 1 has a negative polarity. The voltage level provided by the aforementioned biasing means, not shown, which are connected to the control input No. 2 has a positive polarity. In addition, voltage control signals are applied to input No. 2 and current control signals are applied to input No. 1. These control signals are utilized in the operation of the gate circuit.

Junctions 11, 12 are commonly connected to the output conductor 13' of the gate circuit 10'. Also connected to the conductor 13' is the anode 14*a* of a PN semiconductor diode 14 which is of the charge storage type also known in the art as a snap-off diode. As is well known to those skilled in the art, a charge storage diode accumulates charge carriers when biased in the forward direction and with current passing therethrough in the forward direction. In the present invention, the accumulated charge carriers are used to provide a low impedance connection between terminal 15 and output conductor 13'. The diode 14 is poled in circuit 10' so that current which is provided by control circuit 10B, as explained hereinafter, passes through the diode 14 in a forward direction when control circuit 10B is actuated. Thus, for the particular embodiment shown in FIG. 1, the anode 14*a* of diode 14 is connected to the output conductor 13'. The cathode 14*b* of the diode 14 is connected via terminal 15 to a reference voltage source, not shown, which provides a reference level E*ref* at terminal 15. Conductor 13' is adapted to be connected to some load means and which in the preferred systems embodiment of FIG. 1 hereinafter explained is part of a word organized memory system.

In operation, during the quiescent condition of the gate circuit 10', that is during the period when neither of the aforementioned voltage and current control signals are being applied to the appropriate control inputs Nos. 1, 2, the circuit 10' is biased such that transistor 1 is turned-off and transistor 2 is turned-on. Under these circumstances, no forward current is provided by circuit 10B through the diode 14 because transistor 1 is turned-off and consequently the charge storage diode 14 cannot accumulate charge carriers. Moreover, if any previous accumulated or stored charge carriers are present in diode 14 when circuit 10' is placed in the quiescent condition, they are discharged through the emitter-collector circuit of transistor 2 which is turned-on and, depending on the characteristics of the load, sometimes through the load connected to the output conductor 13', as is explained in greater detail hereinafter, the relatively higher resistance of resistor 9 providing a negligible leakage path for the carriers when this occurs. Thus, in the quiescent condition, reference source E*ref* will be connected to the load through the low impedance path of the charge carriers of diode 14 only if there are charge carriers stored in diode 14 at the time and will remain connected to the load through the low impedance charge carriers as long as they are available. If there are no charge carriers available at the time or if they are subsequently discharged during the quiescent state, the reference source is connected to the load through the high reverse impedance of the diode and is in effect operatively disconnected from the load.

It will now be assumed that a current control signal is applied to control input No. 1 by a suitable current signal generator, not shown, but no voltage control signal is applied to control input No. 2. The current control signal is applied simultaneously to the emitter 4 of transistor 1 and base 3 of transistor 2. The amplitude and polarity of the current control signal is sufficient to cause the transistor 2 to turn-off and the emitter voltage of transistor 1 to change to a level which will permit transistor 1 to turn-on if and when a voltage control signal is concurrently applied to control input No. 2. Thus, in the absence of the voltage control signal, the current control signal causes transistor 2 to turn-off, as aforementioned, and also transistor 1 to remain turned-off. Under these latter conditions, the diode 14 still cannot accumulate charge carriers because the control circuit 10B cannot supply forward current through it as a result of transistor 1 being turned-off Furthermore, under these latter conditions, if there are any previous accumulated carriers in the diode 14, when transistors 1 and 2 are turned-off the carriers will remain stored in the diode 14 or be discharged through the load depending upon its characteristics as explained hereinafter. Hence during the period when only a current signal is applied to circuit 10′, the reference source E*ref* will be connected to the load through the low impedance charge carriers only if there are charge carriers available or in the diode 14 at the time. If there are no charge carriers or if they are subsequently discharged during this period, then the reference source is in effect operatively disconnected from the load by the high impedance of the diode 14.

It will now be assumed that a voltage control signal is applied to control input No. 2 but no current control signal is applied to control input No. 1. The voltage control signal is provided with a voltage generator, not shown, such as a D.C. pulse generator, for example. The voltage control signal is applied via the diode 6 to the base 3 of transistor 1. The polarity and amplitude of the voltage control signal is sufficient to cause transistor 1 to turn-on if the aforementioned current control signal is being concurrently applied to its appropriate associated input and to remain turned-off if the current control signal is not being concurrently applied thereat. If there is no concurrently applied current control signal when the voltage control signal is applied, then transistor 1 remains turned-off and transistor 2 remains turned-on. Under these latter conditions, the diode 14 still cannot accumulate charge carriers for the aforementioned reasons associated with the transistor 1 being in a turned-off condition. Moreover, should any charge carriers be stored in the diode 14, they are discharged through the emitter-collector circuit of transistor 2 and sometimes through the load connected to conductor 13′, depending on the load's characteristics, as explained hereinafter. Again, during the period that only a voltage control signal is applied to circuit 10′, the reference source E*ref* will be connected to the load through the low impedance charge carriers only if there are charge carriers available in the diode 14 at the time. If there are no charge carriers or if they are subsequently discharged during this period, then the reference source E*ref* is in effect operatively disconnected from the load by the high impedance of the diode 14.

Where there is concurrence of the current control signal and voltage control signals at the control input Nos. 1 and 2, respectively, transistor 1 is turned-on and transistor 2 is turned-off as aforementioned. As a result, the diode 14 becomes forward biased and the current which is derived from the current control signal being applied is passed through the emitter-collector circuit of transistor 1 and divides proportionally through the diode 14 as a forward circuit and through resistor 9, the load at the time being effectively short-circuited by the relatively low impedance of the forward biased diode 14. The diode 14 as the current passes through it in the forward direction accumulates charge carriers which provide a low impedance connection between the reference source and the load. If the circuit is thereafter returned to any of its previously described conditions, that is, to its quiescent condition or either of its conditions where only one of the control signals is being applied, the reference source continues to be connected through the low impedance charge carriers as long as they are available in the diode 14 and until they are discharged. In a preferred mode of operation, and wherein the load has selectable high and low impedance characteristics, the load is normally selected to have a high impedance characteristic. During the period in which both control signals are concurrently applied to the gate circuit 10′ and charge carriers have been allowed to accumulate in the diode 14, the load is temporarily selected to have a low impedance characteristics which causes the reference source E*ref* to generate a reverse current through the diode that dissipates the charge carriers. As this occurs, the reference source E*ref* continues to be coupled through the low impedance path of the charge carriers as long as they are available. The time period during which the load has its selected low impedance characteristic is judiciously selected so that the charge carriers are not completely dissipated. When the load is returned to its high impedance characteristic, the diode 14 again begins to accumulate charge carriers. The circuit 10 is then subsequently returned to a quiescent condition whereupon the accumulated charge carriers are discharged through the turned-on transistor 2. During the period the load has its selected low impedance characteristic, the current from circuit 10B is negligible compared to the current from reference source E*ref* and the load is substantially being driven by the current from the reference source E*ref*. When the load has its normal high impedance characteristic, negligible or no current is passed through the load.

By judiciously selecting the coincident time duration period of the current and voltage control signals, and/or the impedance of the load in those cases where the load has selectable high and low impedance characteristics, the amount of charge carriers accumulated in the diode 14 can be controlled. Likewise, the time period during which they are subsequently discharged or remain stored is also readily controllable. The gate circuit 10′ thus can control the duration of the time period during which the reference source at terminal 15 is coupled to the load through the low impedance charge carriers as a result of its ability to control the charge time, discharge time, and/or discharge path of the charge carriers of diode 14 as is discussed hereinafter, as well as the amount of current which is passed through the load in those cases where the gate circuit 10′ is employed as a current driver.

Truth Table I below summarizes the aforedescribed general operating conditions i–iv of the transistors 1, 2 with respect to the current and voltage control signals designated as Ia and VA, respectively, as follows:

TABLE I

| | Ia | VA | Trans. 1 | Trans. 2 |
|---|---|---|---|---|
| i | Not applied | Not applied | Off | On. |
| ii | do | Applied | Off | On. |
| iii | Applied | Not applied | Off | Off. |
| iv | do | Applied | On | Off. |

An alternative mode of operation of the circuit 10′ in those applications where the load has a normally high impedance characteristic and a selectable low impedance characteristic, the current and voltage control signals are concurrently applied to circuit 10′ while the load has its high impedance characteristic. This results in the conditon iv, Table I, and as explained before charge carriers begin to accumulate in diode 14 with the reference source E*ref* being coupled to the load through the low impedance charge carriers but no current being passed through the high impedance load. As before, the load is selected to have its low impedance characteristic as a result of which the charge carriers begin to discharge and current is passed through the load. Before the charge carriers are completely discharged and with the load still having its low impedance characteristic, the circuit 10' is operated in either of the conditions i or ii, which causes transistor 1 to turn-off and transistor 2 to turn-on. The remaining charge carriers are then discharged through transistor 2 as well as the low impedance load. Prior to the complete discharge of the carrier, the load is returned to its high impedance characteristic whereupon the current through the load is terminated and the remainder of the discharge occurs exclusively through the transistor 2.

Referring now to those applications where the load has a predetermined impedance characteristic, in one operational mode of the circuit 10', for these applications the current and voltage control signals are concurrently applied to the control inputs resulting in condition iv, Table I. As explained before, charge carriers begin to be accumulated in the diode 14 and in these applications the load is short-circuited by the forwardly conducting diode 14.

Next, the circuit 10' is operated in one of the conditions i or ii. Under either of these conditions, transistor 1 is turned-off and transistor 2 is turned-on. The accumulated charge carriers continue to present a low impedance path to conductor 13' as aforementioned but now begin to discharge through transistor 2. Depending on whether the impedance characteristic of the load is high or low, the current from the reference voltage applied to terminal 15 will divide proportionally between the emitter-collector circuit of transistor 2, resistor 9 and/or the load. By judiciously selecting the impedances of these elements, that portion of the current supplied by the reference source at terminal 15 and passed through the emitter-collector circuit of transistor 2 can be negligible whereas that portion of this current which is passed through the load may be negligible when the load impedance is high. Discharge of the accumulated carriers is simultaneously taking place substantially through the emitter-collector circuit of transistor 2 when the load impedance is high and through the emitter-collector circuit of transistor 2 and load combination when the load impedance is low, the resistor 9 providing a negligible leakage path as aforementioned. Alternatively, or supplemental thereto, additional control of the time duration of the current passing through the load when it has a low impedance characteristic may be accomplished by placing the circuit 10' in operating condition iv before the termination of the period required to discharge all the carriers thereby causing the diode 14 to begin accumulating charge carriers again and the load to be short-circuited by diode 14 as explained hereinabove.

In another alternative method of operation, after the circuit 10' has been placed in an operating condition iv so that the diode 14 has accumulated storage carriers, the voltage control signal is thereafter removed but the current signal maintained placing the circuit 10' in condition iii. If the load has a high impedance characteristic then the accumulated charge is substantially maintained by the diode 14 and there is substantially no current passed through the diode 14 or through the load. However, if the load has a low impedance characteristic then the reference source provides current to the load through the diode 14 and its low impedance stored carriers, the charge carriers being simultaneously discharged through the load. The carrier discharge and current flow may be effected entirely through the load by maintaining the circuit in condition iii until the charge carriers in the diode have dissipated, or the discharging may be discontinued, i.e. stopped, before complete dissipation through the load by placing the circuit back to one of its other operating conditions i, ii, or iv.

As is obvious to those skilled in the art, in those applications where the load has a low impedance characteristic, the circuit 10 operates as a current driver for the load. In those applications where the load has a high impedance characteristic it operates as a voltage driver or voltage threshold signal generator which generates a voltage signal E*ref* when the diode 14 is forward biased and or has accumulated charge carriers stored therein and a different voltage level when the diode 14 no longer has charge carriers stored therein. As is apparent to those skilled in the art, the gate circuit 10' can be operated with various combinations and permutations of operating conditions, variable or different impedance characteristics of the load, charge carriers charging and discharging times and paths, and/or load current time periods. Moreover, it should be understood that one of the control signals may be selected to be a continuous or enabling signal for the circuit 10' and the other signal selected to be a periodic or aperiodic signal which is responsive, for example, to some predetermined control means.

The systems aspects of the present invention will now be described. Referring to FIG. 1, there is shown a preferred first embodiment of the gate system of the present invention. The system in combination includes at least one gate circuit 10' and a plurality of load means, each of which has a selectable high and low impedance characteristic which are connected to the output or conductor 13' of the gate circuit. More particularly, in the preferred systems embodiment of FIG. 1, the load comprises a plurality of series connected circuits 16–17, and more particularly a conventional high speed diode 16 and a memory word line 17, shown schematically therein and identified by the legend WORD LINE. The diodes 16 are part of a direct drive matrix 18, only partially shown, and the word lines 17 are part of the word line set, partially shown, of a word organized thin film memory system, the rest of which is not shown for sake of clarity, and which may be configured similar to the direct drive matrix and memory system described in the aforementioned co-pending application. As such, across each of the intersections of the $x$ and $y$ selection lines of the direct drive matrix 18 there is connected one of the series connected circuits 16–17. Selectable current sinks 19 having control inputs, e.g. input **19*a*, terminate the $x$ selection lines of the matrix 18 and identical gate circuits, e.g. circuits 10', 10'', 10''', terminate the $y$ selection lines. A current sink 19 comprises a common part of the different loads connected thereto, i.e. the circuits 16–17** connected to the $x$ line which is terminated by the particular current sink. When a particular current sink is selected, it receives the current from the appropriate one of the identical selected gate circuits, each of which is a current driver or current source in the system embodiment of FIG. 1.

During a read or write operation, as is well known to those skilled in the art, one of the memory word lines 17 is selected by applying coincident control signals to the inputs of its associated gate circuit and current sink. The diodes 16 are so poled that when this occurs, the corresponding diode 16 becomes forward biased and conducts allowing passage of the current from the gate circuit to the current sink and thereby resulting in the driving of the particular word line to which the diode 16 is connected. The other diodes 16 remain in their normally reverse biased conditions and consequently none of the other word lines are driven, i.e. selected. The gate circuit, e.g. circuit 10', in the system embodiment of FIG. 1 is utilized as a current driver or current source as aforementioned. It should be understood that each of the selection line circuits or loads comprises a diode 16, word line 17 and a common one of the current sinks 19 and has a normally high impedance characteristic if not fully, i.e. coincidentally, selected by its associated current source circuit, e.g. circuit 10', and its associated current sink 19. When it is fully selected, then the selection line circuit has a low impedance characteristic.

In the preferred system mode of operation, the voltage and current control signals are concurrently applied to the gate circuit, e.g. circuit 10', which is connected to the selection line containing the particular word line desired to be selected, e.g. the word line 17 associated with the intersection of the X1 and Y1 selection lines. Under these circumstances, the circuit 10' is in an operating condition iv and the storage diode 14 is accumulating charge carriers, as aforedescribed. As such, current from the current control signal is passing through the turned-on transistor 1 and in a forward direction through the diode 14, transistor 2 being turned-off as previously explained. During this same period, no control signals are being applied to the inputs of the current sinks 19 and consequently the various loads are in their respective high impedance characteristics and no current passes through the loads. After a sufficient charge is allowed to accumulate in the storage diode 14, the current sink 19 associated with the selection line X1 in the given example is activated and as a result the load associated with the X1 and Y1 selection line intersection is placed in its low impedance characteristic. A current from the reference source at terminal 15 now begins to flow through the low impedance charge carriers and in a reverse direction through the diode 14 and through the load associated with the aforementioned intersection. This results in a current signal being transmitted through the associated word line 17 and the stored carriers being discharged through the load. During the period when the control signals are being concurrently applied to the gate circuit 10' and the current sink 19 which is associated with selection line X1, the other loads connected to line Y1 remains in their respective high impedance characteristics because their associated current sinks 19, i.e. those associated with the *x* selection lines X2 to X*n*, have not been selected and accordingly no driving current from the gate 10' is transmitted through the word lines 17 associated with these last mentioned loads. As is obvious, during this same last mentioned period, the other gate circuits, e.g. circuits 10'', 10''', which are connected to the selection line X1 not having been selected do not cause the other loads associated with line X1 to be placed in their respective low impedance characteristics and consequently no current is passed through the word lines 17 associated with these last mentioned loads. The diodes 16 associated with the other *x* and *y* selection lines remain reverse biased and their associated loads remain in their high impedance characteristics since both their associated current drivers and current sinks have not been selected.

Before the carriers are fully discharged, the control signal from the particular current sink 19 is removed and as a result the associated load is returned to its high impedance characteristic and the current stops flowing in the associated word line. Simultaneously, or shortly thereafter, the circuit 10' is placed in the operation condition i. The remaining charge carriers, which are still stored in the diode 14 at this time, are then discharged through the turned-on transistor 2. In the preferred system mode of operation of FIG. 1, the period of application of the control signal to the current sink is selected to be equal to or less than the time required to discharge all the stored carriers. Thus, the current from Eref substantially passes through the selected word line through the low impedance path of the accumulated charges only during the period the associated load has its low impedance characteristic. However, as is obvious to those skilled in the art, other modes of operations of the system of FIG. 1 are possible such as those which include certain ones of those described for the gate curcuit embodiment hereinabove.

The charge storage diode 14 in the system of FIG. 1 allows the reference source Eref and diode 14 identified by the dash line block 16A, to be mounted in close proximity to the word lines 17 thereby providing shortened connections thereto and mitigating the adverse affects caused by the use of long conductor connections such as were associated with the aforedescribed transistor gate of the prior art. Moreover, the control part, shown by the dash line block 10B, of the circuit 10' can be remotely located in a practical manner from the site of the word lines 17 since it is part 10A of the circuit 10' that delivers the driving current to the selected one of the word lines, the current from part 10B being substantially negligible. For purposes of illustration, the conductor connecting the parts 10A and 10B is shown partially as a broken line in only the circuit 10'. It should be understood that the other gate circuits, e.g. circuits 10'', 10''', have similar corresponding parts but are shown in respective single blocks for sake of clarity. Furthermore, since the driver current is delivered through the relatively low impedance of the charge carriers of storage diode 14, it improves the rise time of the driver signal over that of the prior art transistor gate circuit, which was delivered through the somewhat higher impedance of the transistor. The system of FIG. 1 thus results in an improved read out signal which is sensed in the bit-select lines, not shown for sake of clarity, that coact with the word lines of the aforementioned word organized memory. Moreover, while the gate circuits, e.g. circuits 10, 10', 10''' of FIG. 1, may be operated with independent biasing means and/or reference sources, one or more of the circuits may be modified to share common biasing means and/or reference sources as is obvious to those skilled in the art. Moreover, the gate circuits of FIG. 1 are preferably arranged in a selection matrix for addressinug the *y* set of selection lines of the direct drive matrix 18 as will become apparent from the gate matrix system embodiment shown in FIG. 2 which will now be described.

Figure 2:
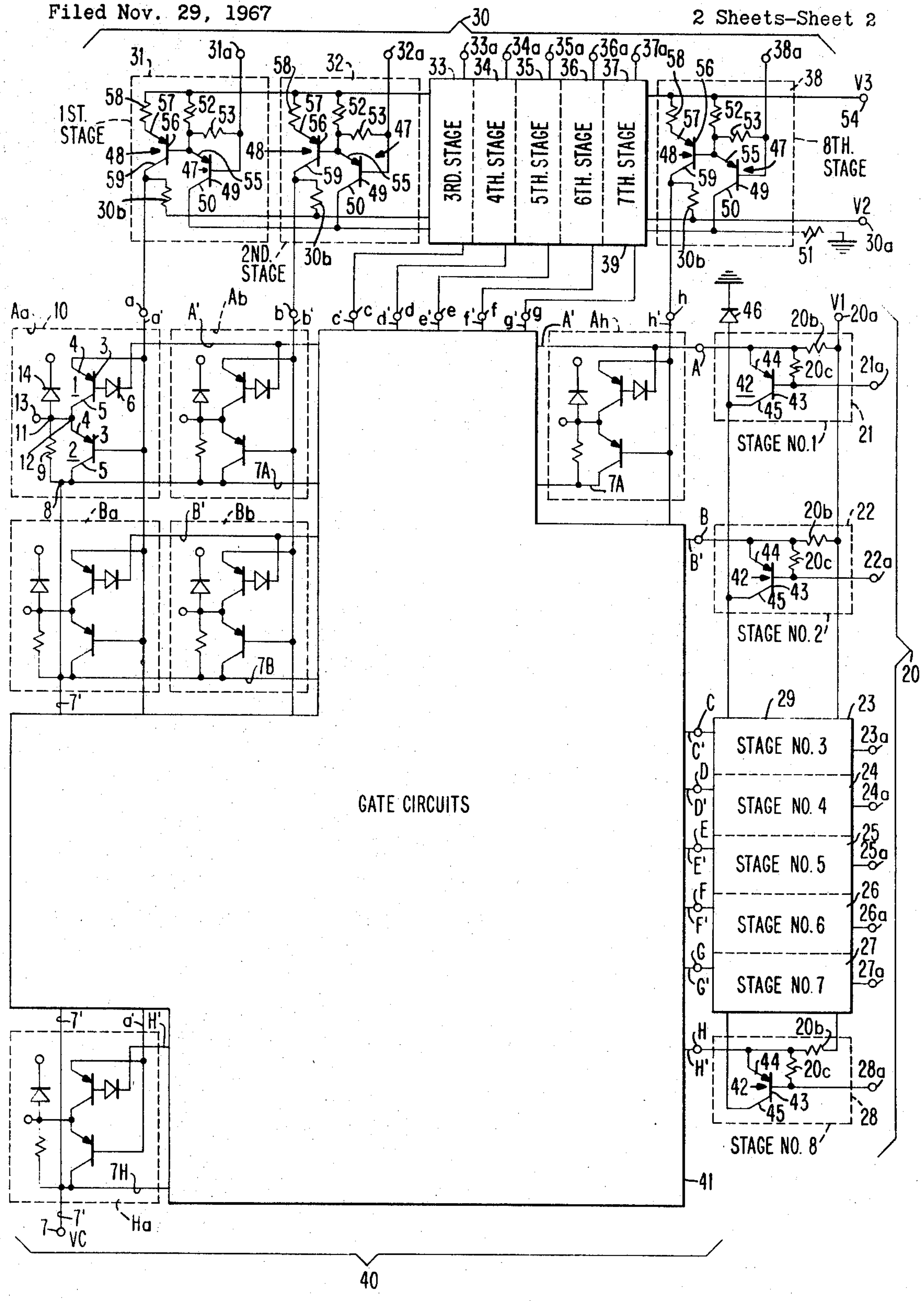
FIG. 2 is a schematic view of another embodiment of the gate system of the invention.

In FIG. 2 there is illustrated a two-dimensional gate matrix system embodiment of the invention and it is provided with a selectable voltage control signal source 20, a selectable current control signal source 30 and an array of gate circuits 40. Each gate circuit of the array 40 is identical to the gate circuit 10' of FIG. 1. Thus, as shown in detail by the dash line block 10 which indicates generally the first gate circuit A*a* of the array 40, each gate circuit of the array 40 is provided with first and second identical PNP conductivity type transistors 1, 2 having respective bases 3, emitters 4, and collectors 5. Emitter 4 of transistor 1 and base 3 of transistor 2 of the first circuit A*a*, as well as predetermined others of the gate circuits of matrix 40 as is explained hereinafter, are connected via conductor *a'* to a common control input illustrated in FIG. 2 as a terminal *a* for purposes of explanation. Another common control input, also illustrated as a terminal A by way of example, is provided for controlling the base 3 of transistor 1 of circuit A*a*, as well as predetermined other gate circuits of the gate matrix 40 as explained hereinafter, and is connected thereto by conductor A'.

As in the gate circuit 10' shown in FIG. 1, a semiconductor PN junction diode 6 may be provided in each of the gate circuits of FIG. 2. It has its anode connected to the base 3 of transistor 1 and its cathode connected to terminal A in circuit A*a*. A common bias supply, not shown, provides a voltage level V*c* at bias input terminal 7 which is connected through conductor 7' to the junction 8 of the bias resistor 9 and collector 5 of transistor 2 of circuit A*a*. Additional biasing means are also provided at terminals A and *a*. The biasing means at terminal A includes the bias supply, not shown, that provides a voltage level V1 at terminal 20*a* of control circuit 20 and the bias resistor 20*b*. Similarly, the biasing means at terminal *a* includes the bias supply, not shown, that provides a voltage level V2 at terminal 30*a* and the bias resistor 30*b* of selection control circuit 30. It is to be understood that while the gate circuits of the matrix 40 share the respective bias means of circuits 20 and 30 in the preferred embodiment, the system of FIG. 2 could be configured with independent bias means for one or more of the gate circuits and/or one or more of the stages of the circuits 20, 30. It is to be understood, moreover, that a common power supply with appropriate various output taps or terminals can provide the respective voltage levels V*c*, V1, and V2, as well as V3 hereinafter described, as is well known to those skilled in the art.

For the PNP conductivity type transistors 1, 2, the voltage levels V1 and V3 have positive polarities, and the voltage levels V2 and VC have negative polarities. In addition, voltage control signals are applied to terminal A and current control signals are applied to terminal *a*. These control signals are utilized in the operation of the gate circuit A*a*, as well as predetermined others, as will be apparent hereinafter. The voltage and current control signals are derived from the selection circuits 20 and 30, respectively.

Junctions 11, 12 and the output terminal 13 of the gate circuit A*a* are commonly connected. Connected to the junction 11 is the anode of the PN semiconductor diode 14 which is of the charge storage type. The cathode of diode 14 is connected via the terminal shown thereat in FIG. 2 to a reference voltage level such as, for example, ground. Output terminal 13 is connected to a load, not shown.

By way of example, the gate circuits of matrix 40 are shown in FIG. 2 as being configured in a symmetrical rectangular array, and more particularly in a square 8 x 8 array. For purposes of explanation, the sixty-four gate circuits of matrix 40 are designated in FIG. 2 by the horizontal row and the vertical row or column terminals, i.e. terminals A–H and *a–h*, respectively, to which they are connected. Only the gate circuits A*a*, A*b*, A*h*, B*a*, B*b* and H*a* are shown in detail, the other fifty-eight gate circuits being generally indicated by the block 41 for sake of clarity. Thus, in each horizontal row of gate circuits, the bases of the transistors, which correspond to transistor 1 of the gate circuit 10, of the gate circuits of the particular row are commonly connected via their respective diodes, which correspond to the diode 6 of the gate circuit 10, to an appropriate one of the terminals A–H by the appropriate one of the conductors A′–H′. As such, conductor A′ connects terminal A to these corresponding diodes, e.g. diodes 6, of the gate circuits A*a*, A*b* . . . A*h* of the first horizontal row; conductor B′ connects terminal B to these corresponding diodes of the gate circuits B*a*, B*b* . . . B*h* of the second horizontal row; etc. Similarly, in each vertical column of gate circuits, the emitters of the transistors, which correspond to transistor 1 of the gate circuit 10, of the gate circuits of the particular column and the bases of the transistors, which correspond to transistor 2 of the gate circuit 10, of the gate circuits of the particular column are commonly connected to an appropriate one of the terminals *a–h* by an appropriate one of the conductors *a′–h′*. As such, conductor *a′* connects terminal *a* to these corresponding emitters and bases of the gate circuits A*a*, B*a* . . . H*a* of the first vertical column; conductor *b′* connects terminal *b* to these corresponding emitters and bases of the gate circuits A*b*, B*b* . . . H*b* of the second vertical column; etc. Each of the junctions of the gate circuits of the array 40 which correspond to the junction 8 of gate circuit 10 are commonly connected to terminal 7. By way of example, conductor 7A connects these corresponding junctions of the first horizontal row to terminal 7 via conductor 7′, conductor 7B connects these corresponding junctions of the second horizontal row to terminal 7 via conductor 7′, etc.

Selection circuit 20 provides plural identical stages 21–28 which correspond to the number of horizontal rows of the matrix 40. For sake of clarity, only the first, second and last stages 21, 22 and 28 are illustrated in detail and the remaining stages 23–27 are indicated by the block 29 as shown in FIG. 1. In the drawing, stages 21–28 are designated stages No. 1–No. 8, respectively, to distinguish them from the selection stages 31–38 of selection circuit 30 which are designated therein as the 1st, 2nd, 3rd, etc. stages, respectively. Each of the stages 21–28 is a transistor switching circuit and when actuated by a selection signal at its particular input terminal, e.g. terminals 21*a*–28*a*, causes the aforementioned voltage control signal to be applied to the control terminal, e.g. terminals A–H, to which the particular stage is connected.

In the preferred gate matrix system embodiment of the invention, each of the stages 21–28 provides a transistor 42 which is compatible to the conductivity types used in the gate circuit of the matrix 40. Thus, for the gate circuits' PNP transistors, e.g. transistors 1, 2, a PNP transistor 42 is employed in each of the stages 21–28. The base 43 of the transistor 42 is connected to its input terminal, e.g. terminal 21*a*. Bias resistor 20*c* is connected across the emitter 44 and base 43 of the transistor 42 and is connected via biasing resistor 20*b* to the bias supply terminal 20*a* to which is connected the bias supply, not shown, which provides the aforementioned voltage level V1. Each of the collectors 45 of the transistors 42 are commonly connected to the anode of a semiconductor PN junction diode 46 which in turn has its cathode connected to a suitable reference voltage lever, which by way of example is ground.

In operation, in the absence of an input signal to any of the input terminals 21*a*–28*a* of the selection circuit 20, the corresponding bases 43 of transistors 42 of stages 21–28 bias their corresponding transistors 42 at turn-off and as a result, each of the terminals A–H will be at a voltage level derived from the voltage level V1. Upon application of the input signal to the base 43 of the transistor 42 of a particular one of the stages 21–28, e.g. the input 21*a* of stage 21 for purposes of explanation, that particular transistor 42 is turned-on. The aforementioned voltage control signal is applied to the particular one of the terminals A–H to which the stage is connected, and which in the given example is terminal A. The turning-on of the particular transistor 42 forward biases diode 46 whereupon the reference voltage, which is ground in the particular example being described and connected to diode 46, is transmitted through the emitter collector circuit of the particular transistor 42 and to the particular one of the control terminals A–H to which it is connected. Since no output signals have been applied to the other input terminals, terminals 22*a*–28*a* in the given example, their respective transistors 42 remain turned-off and the reference voltage, e.g. ground, transmitted through the diode 46 is not applied through their respective emitter-collector circuits to the other control terminals, e.g. terminals B–H in the given example. Thus, the selection circuit 20 selectively provides the aforementioned voltage control signals to the teminals A–H.

Selection circuit 30 provides plural identical stages 31–38, which correspond to the number of vertical rows or columns of the matrix 40. For sake of clarity, only the first, second and last stages 31, 32 and 38 are illustrated in detail in FIG. 2 and the remaining stages 33–37 are indicated by the block 39. Each of the stages 31–38 has a transistorized switching circuit which when actuated by a selection signal at its particular input terminal, e.g. terminals 31*a*–38*a*, causes the aforementioned current control signal to be applied to the control terminal, e.g. terminals *a–h*, to which the particular stages 31–38 is connected.

In the preferred gate matrix system embodiment, each of the stages 31–38 provides a pair of first and second transistors 47, 48 which are compatible to the conductivity types used in the gate circuits of the matrix 40. For the PNP transistors, e.g. transistors 1, 2 of the preferred gate circuit embodiment shown in FIG. 2, transistors 47, 48 are thus also of the PNP type. Each of the bases, e.g. base 49, of the first transistors, e.g. transistor 47 is connected to a respective input terminal, e.g. terminals 31*a*–38*a*, and each of their collectors, e.g. collector 50, is grounded via the common resistor 51. A pair of biasing resistors 52, 53 is provided in each of the stages 31–38. Resistor 52 connects the power supply terminal 54 to the emitter 55 of the first transistor 47. The base 49 of transistor 47 is connected to terminal 54 through the resistor combination 52, 53 as shown in FIG. 1. The power supply provides the voltage level V3 at terminal 54. The emitter 55 of each of the respective transistors 47 is connected to the base 56 of the second transistor of the same stage 48. The respective emitter 57 of transistor 48 are connected to the common bias terminal 54 via bias resistors 58. Each of the collectors 59 of the transistors 48 are connected via an aforementioned respective bias resistor 30*b* to terminal 30*a* and also to one of the appropriate input control terminals, e.g. terminals *a–h*.

In operation, the transistors 47, 48 of each of the stages 31–38 are biased such that in the absence of a selection signal to its particular input terminal 31*a*–38*a*, the selection circuit 30 does not generate the aforementioned current control signal to the appropriate particular control terminal, e.g. terminals *a–h*, to which it is connected. Under these conditions, the transistors 47, 48 are turned off, i.e. not conductive. When a selection signal is applied to one of the terminals 31*a*–38*a*, the transistors 47, 48 of the particular associated stage are turned-on and the current from the bias supply at terminal 54 is passed via the respective resistor 58 through the emitter-collector circuit of transistor 48 to the particular one of the control terminals *a–h* to which it is connected. As is apparent to those skilled in the art, coincident selection of one of the stages 21–28 from the selection circuit 20 and one of the stages 31–38 from the selection circuit 30 will select the gate circuit of the matrix 40 which is commonly connected to the two selected stages since there will be present concurrently at its control inputs the aforementioned voltage and current control signals. This allows charge carriers to be accumulated in the diode 14 of the selected gate circuit which provide a low impedance path between the reference source E*ref* and the load which is connected to the particular output terminal 13 for the reasons previously explained. The other gate circuits which are commonly connected to the horizontal row which is associated with the selected gate circuit, as well as the other gate circuits which are commonly connected to the vertical row or column of the selected gate circuit, will not have concurrently applied voltage and current control signals at their inputs and hence no charge carriers are stored in their corresponding diodes 14. As a result, no output signals appear at the respective output terminals 13 associated with the last mentioned diodes. Depending on the impedance characteristics of the load to which the selected gate circuit is connected, the resultant signal of the selected gate can be either of the current driver signal type or of the voltage driver or generator signal type. The gate matrix system 20, 30, 40 of FIG. 2 is preferably operated with the gate circuits thereof providing current signals and which preferably drive a set of selection lines of a memory system such as the set of *y* selection lines of the direct drive matrix 18 of the memory system of FIG. 1 and particularly in the preferred operational mode previously described. In regards to the latter and as is apparent to those skilled in the art, the gate matrix system of FIG. 2 may alternatively be operated to drive the word lines of the word organized memory system of FIG. 1 directly in certain applications. It is to be understood further that preferably two or more or all of the gate circuits of the matrix 40 are configured to share a common reference source in most applications and particularly where the requirements of the different loads connected to the matrix 40 have substantially identical impedance characteristics. However, in other applications because the requirements of one or more of all of the different loads are substantially at a variance, then one or more or all of the gate circuits accordingly may employ independent reference sources.

Typical values for the circuit of FIG. 2 are inidcated in Table II, as follows:

TABLE II

Gate circuits, e.g. circuit 10, each:
- Transistors 1, 2—Type 2N2894, each
- Diode 6—Type 1N3600, each
- Diode 14—Type HPA0240, each
- Resistor 9—500 ohms, each Voltage selection stages, e.g. stage 21, each:
- Transistor 42—Type 2N2894, each
- Resistor 20*b*—400 ohms, each
- Resistor 20*c*—2500 ohms, each
- Diode 46—Type 1N3600

Current selection stages, e.g. stage 31, each:
- Transistor 47, 48—Type 2N2894, each
- Resistor 30*b*—1000 ohms, each
- Resistor 51—200 ohms
- Resistor 52—330 ohms, each
- Resistor 53—2500 ohms, each
- Resistor 58—33 ohms, each
- Voltage V1—+6 volts
- Voltage V2—−6 volts
- Voltage V3—+6 volts
- Voltage VC—−6 volts Thus as described hereinabove, the broad aspects of the present invention include inter alia gate circuit apparatus for connecting a reference source, e.g. reference source E*ref* not shown, to a predetermined load, e.g. load 16–17, 19 of FIG. 1, wherein the circuit apparatus comprises a charge storage diode means coupled between the reference source and the load, e.g. circuit part 10A of FIG. 1, and selectable means, e.g. circuit part 10B of FIG. 1, for controlling the charge storage diode means. More particularly, the control means selectively forward biases the diode means so that the diode means accumulates charge carriers therein. The accumulated charge carriers provide a low impedance connection between the reference source and the load. In the preferred embodiments, the control means comprises a pair of first and second switching amplifiers. The first switching amplifier when turned-on allows the charge storage diode means to be forward biased and to accumulate the charge carriers while the second switching amplifier is turned-off. With the second switching amplifier turned-on and with the first switching amplifier turned-off, or with both switching amplifiers turned-off, the reference source continues to be connected through the accumulated charge carriers, if any, of the storage diode means.

In the present invention, because the driving signal passes through the charge storage diode instead of the transistor of the known gate circuit heretofore described, the voltage drop across the charge storage diode is considerably less than that across the last-mentioned transistor. As a result, the gate circuit of the present invention does not dissipate as much power and/or it provides an improved low impedance connection, as aforementioned. For a given power dissipation, a greater number of gate circuits of the present invention can be employed than the number of known transistor gate circuits which were employed in the past. As a result, the gate circuit matrix of the invention, for example, has an addressing capability greater than a gate circuit matrix configured with the known transistor gate circuits. Moreover, the circuit of the present invention is readily adapted for construction as a monolithic circuit of the type using diffused resistors, transistors and PN junction diodes. However, it is to be understood that the circuit can be practiced with discrete component elements as well as integrated circuit component elements and or combinations of integrated circuit components and discrete component elements.

In the preferred embodiments, the various transistors are of the same PNP conductivity type. However, as is apparent to those skilled in the art, the invention may be practiced with NPN conductivity types and/or both, i.e. complementary, conductivity types by appropriate modification of the circuitry and/or modifications of the appropriate polarities and levels of the biasing voltages and/or signals. It should be also understood that each of the switching amplifiers of the preferred gate circuit embodiments is of the semiconductor type and has its base electrode as the control input terminal and the collector and emitter electrodes as the two output terminals. However, as is apparent to those skilled in the art, the invention may also be practiced with the switching amplifiers configured as vacuum tube types as well as other combinations of the amplifier electrodes acting as the control terminal and output terminals. Furthermore, it should be understood that in the preferred embodiment of the system of FIG. 1 the magnetic memory system is organized on a word line basis and more particularly is a memory array employing thin magnetic film elements. As is also apparent to those skilled in the art, the system embodiment of the present invention may be practiced with other types of magnetic memory systems organized on other bases and/or with other types of memory systems which employ other kinds of magnetic storage elements such as magnetic storage core elements and the like. Likewise, while the system of FIG. 1 is shown as addressing only one set of addressing or selection lines, e.g. the *y* set, of the magnetic storage array of a memory system, it should be understood that the other sets, e.g. the *x* and *z* sets, alone or in combination could be addressed by appropriate modifications of the system of the invention as is apparent to those skilled in the art. Moreover, it should be understood that while in the systems of FIGS. 1 and 2 the gate circuits thereof are arranged in two dimensional embodiments and the invention may be practiced in one dimension embodiments as well.

Thus, while the invention has been particularly shown and described with reference to preferred embodiments thereof, it will be understood by those skilled in the art that the foregoing and other changes in form and details may be made therein without departing from the spirit and scope of the invention.

What is claimed is:

1. Gate circuit apparatus for connecting a reference source to at least one predetermined load, said circuit apparatus comprising:
   - charge storage diode means coupled between said reference source and said load; and
   - selectable control means for controlling said charge storage diode means, said control means being in a non-series coupling relationship with said load and when selected forward biasing said diode means and passing current therethrough in a forward direction to accumulate charge carriers therein, said reference source being coupled through the low impedance path of said charge carriers to said load whenever said diode means has charge carriers stored therein, said non-series coupling relationship causing load current when present not to pass thru said control means.

2. Gate circuit apparatus for connecting a reference source to at least one predetermined load, said circuit apparatus comprising:
   - charge storage diode means coupled between said reference source and said load; and
   - selectable control means for controlling said charge storage diode means, said control means when selected forward biasing said diode means and passing current therethrough in a forward direction to accumulate charge carriers therein, said reference source being coupled through the low impedance path of said charge carriers to said load whenever said diode means has charge carriers stored therein, said selectable control means further comprising:
   - first switching amplifier means coupled to said diode means for passing said forward current therethrough; and
   - second switching amplifier means coupled to said diode means;
   - said first and second switching amplifier means having concurrent conducting and non-conducting states, respectively, when said diode means is accumulating charge carriers; and said first switching amplifier means having a non-conducting state and said second switching amplifier means having a concurrent predetermined one of the conducting and nonconducting states when said diode means is not accumulating charge carriers, said conducting and non-conducting states of said second switching amplifier means providing and not providing, respectively, a discharge path for said charge carriers whenever said diode means has charge carriers stored therein.

3. Gate circuit apparatus according to claim 2 wherein said load has selectable high and low impedance characteristics, said reference source providing a current driver signal through said diode means in a reverse direction to said load when said diode means has charge carriers stored therein and said load has its selected low impedance characteristic.

4. Gate circuit apparatus according to claim 3 wherein said load is temporarily selected to have a low impedance characteristic after said diode means begins to accumulate said charge carriers and during the period of said concurrent conducting and non-conducting states of said first and second switching amplifier means, respectively, a predetermined portion of said accumulated charge carriers being discharged through the load when it is selected to have its low impedance characteristic.

5. Gate circuit apparatus according to claim 2 wherein said gate circuit is connected to a pluralitc of loads, each of said loads having selectable high and low impedance characteristics, said reference source providing current driver signals through said diode means in a reverse direction to each of said loads selected to have a low impedance characteristic when said diode means has charge carriers stored therein.

6. Gate circuit apparatus according to claim 4 wherein each of said selected loads is temporarily selected to have a low impedance characteristic after said diode means begins to accumulate said charge carriers and during the period of said concurrent conducting and non-conducting states of said first and second switching amplifier means, respectively, a predetermined portion of said accumulated charge carriers being discharged through each of the loads selected to have a low impedance characteristic.

7. Gate circuit apparatus according to claim 5 wherein said plurality of loads comprises a corresponding plurality of selection line means of a predetermined set of selection line means of a magnetic memory system.

8. Gate circuit apparatus according to claim 7 wherein said magnetic memory system is organized on a word line basis and is of the thin magnetic film storage element type, each of the selection line means of said plurality of selection line means comprising one of the word line conductors of said magnetic memory system.

9. Gate circuit apparatus according to claim 2 wherein said load has a predetermined low impedance characteristic, said reference source providing a current driver signal through said diode means in a reverse direction to said load when said diode means has charge carriers stored therein and said first switching amplifier means is in a non-conducting state.

10. Gate circuit apparatus according to claim 2 wherein said load has a high impedance characteristic, said reference source providing a voltage driver signal to said load whenever said storage diode means has charge carriers stored therein.

11. Gate circuit apparatus according to claim 2 wherein said first and second switching amplifier means are first and second semiconductor elements, respectively, each of said semiconductor elements having a control input and a pair of outputs, one of said outputs of said first semiconductor element being connected to the control input of said second semiconductor element, the other of said outputs of said first semiconductor element being commonly connected to the one of the outputs of said second semiconductor element and the connection junction of said diode means and said load, said control inputs of said first and second semiconductor elements being responsive to predetermined voltage and current control signals, respectively.

12. Gate circuit apparatus according to claim 11 wherein said diode means is forward biased during concurrent application of said voltage and current control signals, said diode means being reverse biased whenever at least said current control signal is not applied.

13. Gate circuit apparatus according to claim 11 wherein said first and second semiconductor elements are first and second transistors, respectively, having predetermined identical conductivity types and wherein said control inputs comprise the bases of said transistors and wherein said pair of output means comprises the collectors and emitters of said transistors, the collector of the transistor of said first switching amplifier means being commonly connected to the emitter of the transistor of said second switching amplifier means at said junction, and the emitter of the transistor of the first switching amplifier means being connected to the base of the transistor of said second switching amplifier means.

14. Gate circuit apparatus according to claim 13 wherein said load has selectable high and low impedance characteristics, said reference source providing a current driver signal through said diode means in a reverse direction to said load when said diode means has charge carriers stored therein and said load has its selected low impedance characteristic.

15. Gate circuit apparatus according to claim 14 wherein said load is temporarily selected to have a low impedance characteristic after said diode means begins to accumulate said charge carriers and during the period of said concurrent conducting and non-conducting states of said first and second switching amplifier means, respectively, a predetermined portion of said accumulated charge carriers being discharged through the load when it is selected to have its low impedance characteristic.

16. Gate circuit apparatus according to claim 13 wherein said gate circuit is connected to a plurality of loads, each of said loads having selectable high and low impedance characteristics, said reference source providing current driver signals through said diode means in a reverse direction to each of said loads selected to have a low impedance characteristic when said diode means has charge carriers stored therein.

17. Gate circuit apparatus according to claim 16 wherein each of said selected loads is temporarily selected to have a low impedance characterstic after said diode means begins to accumulate said charge carriers and during the period of said concurrent conducting and non-conducting states of said first and second switching amplifier means, respectively, a predetermined portion of said accumulated charge carriers being discharged through each of the loads selected to have a low impedance characteristic.

18. Gate circuit apparatus according to claim 17 wherein said plurality of loads comprises a corresponding plurality of selection line means of a predetermined set of selection line means of a magnetic memory system.

19. Gate circuit apparatus according to claim 18 wherein said magnetic memory system is organized on a word line basis and is of the thin magnetic film storage element type, each of the selection line means of said plurality of selection line means comprising one of the word line conductors of said magnetic memory system.

20. Gate circuit apparatus according to claim 13 wherein said load has a predetermined low impedance characteristic, said reference source providing a current driver signal through said diode means in a reverse direction to said load when said diode means has charge carriers stored therein and said first switching amplifier means is in a non-conducting state.

21. Gate circuit apparatus according to claim 13 wherein said load has a high impedance characteristic, said reference source providing a voltage driver signal to said load whenever said storage diode means has charge carriers stored therein.

22. Gate circuit apparatus according to claim 13 wherein said transistors are of the PNP conductivity type, said charge storage diode having an anode connected to said junction and a cathode connected to said reference source.

23. A gate circuit system for selectively connecting reference source means to plural predetermined loads, said system comprising in combination:
- first signal generator means providing a first control signal;
- second signal generator means providing a second control signal; and
- a plurality of gate circuits arranged in a predetermined array, said array having at least one row of at least two of sid gate circuits, each of said gate circuits of said row having charge storage diode means associated therewith coupled between said reference source means and at least one associated load of said plurality loads and further having selectable control means responsive to said first and second control signals for controlling said associated charge storage diode means in response to said first and second control signals, each of said control means being in a non-series coupling relationship with any load associated with the particular gate circuit thereof and when selected forward biasing the diode means associated therewith and passing current therethrough in a forward direction to accumulate charge carriers therein, said reference source means being coupled through the low impedance path of said charge carriers to at least said one of the loads associated with the gate circuit having the selected control means whenever the associated diode means thereof has charge carriers stored therein;

at least one of said first and second control signals being applied simultaneously to the gate circuits of said row, the other of said control signals being selectively applied to the gate circuits of said row, the charge carriers being accumulated in the diode means of the selected gate circuit of said row when said first and second control signals are applied concurrently thereto and not being accumulated when at least one of said first and second control signals is not applied.

24. A gate circuit system for selectively connecting reference source means to plural predetermined loads, said system comprising in combination:
- first signal generator means providing a first control signal;
- second signal generator means providing a second control signal; and
- a plurality of gate circuits arranged in a predetermined array, said array having at least one row of at least two of said gate circuits, each of said gate circuits of said row having charge storage diode means associated therewith coupled between said reference source means and at least one associated load of said plural loads and further having selectable control means responsive to said first and second control signals for controlling said associated charge storage diode means in response to said first and second control signals, each of said control means when selected forward biasing the diode means associated therewith and passing current therethrough in a forward direction to accumulate charge carriers therein, said reference source means being coupled through the low impedance path of said charge carriers to at least said one of the loads associated with the gate circuit having the selected control means whenever the associated diode means thereof has charge carriers stored therein;

at least one of said first and second control signals being applied simultaneously to the gate circuits of said row, the other of said control signals being selectively applied to the gate circuits of said row, the charge carriers being accumulated in the diode means of the selected gate circuit of said row when said first and second control signals are applied concurrently thereto and not being accumulated when at least one of said first and second control signals is not applied, each of said selectable control means of the gate circuits of said row further comprising:

first switching amplifier means coupled to said diode means for passing said forward current therethrough; and second switching amplifier means coupled to said diode means;

said first and second switching amplifier means having concurrent conducting and non-conducting states, respectively, when said diode means is accumulating charge carriers; and said first switching amplifier means having a non-conducting state and said second switching amplifier means having a concurrent predetermined one of the conducting and non-conducting states when said diode means is not accumulating charge carriers, said conducting and non-conducting states of said second switching amplifier means providing and not providing, respectively, a discharge path for said charge carriers whenever said diode means has charge carriers stored therein.

25. A gate circuit system according to claim 24 wherein each of said first and second switching amplifier means of each of the control means of said gate circuits further comprises a pair of first and second semiconductor elements, respectively, each of said semiconductor elements having a control input and two outputs associated therewith, one of said outputs of the first semiconductor element of the pair being connected to the control input of the second semiconductor element of the pair, the other of the outputs of the first semiconductor element of the pair being commonly connected to the one of the outputs of the second semiconductor element of the pair and the connection junction of the diode means and load associated with the particular pair, said control inputs of the first and second semiconductor elements of the pair being responsive to said first and second control signals, respectively, said first and second control signals being voltage and current control signals, respectively.

26. A gate circuit system according to claim 25 wherein the control inputs of the corresponding first semiconductor elements of the gate circuits of said row are commonly coupled to said first signal generator means, said second signal generator means having plural selectable outputs associated therewith, the commonly coupled output and control input of the first and second semiconductor elements, respectively, of a pair being exclusively commonly coupled to one of the plural outputs of said second signal generator means.

27. A gate circuit system according to claim 25 wherein the commonly coupled output and control input of the first and second semiconductor elements, respectively, of each of the corresponding pairs of the gate circuits of said row are commonly connected to said second signal generator means, said first signal generator means having plural selectable outputs associated therewith, the control inputs of the corresponding first semiconductor elements of the gate circuits of said row being coupled to mutually exclusive different ones of said plural outputs of said first signal generator means.

28. A gate circuit system according to claim 25 wherein during concurrent application of said voltage and current control signals to a predetermined gate circuit of said row the diode means associated with said predetermined gate circuit is forward biased, said diode means of the gate circuits of said row being reverse biased whenever at least said current control signal is not applied.

29. A gate circuit system according to claim 25 wherein each of said loads has selectable high and low impedance characteristics, said reference source means providing a current driver signal to a load when the diode means associated with the load has charge carriers stored therein and the load has its selected low impedance characteristic, the current driver signal being passed through the associated diode means in a reverse direction.

30. Gate circuit apparatus according to claim 29 wherein said plurality of loads comprises a corresponding plurality of selection line means of a predetermined set of selection line means of a magnetic memory system.

31. Gate circuit apparatus according to claim 30 wherein said magnetic memory system is organized on a word line basis and is of the thin magnetic film storage element type, each of the selection line means of said plurality of selection line means comprising one of the word line conductors of said magnetic memory system.

32. A gate circuit system for selectively connecting reference source means to plural predetermined loads, said system comprising in combination:

first signal generator means having a plurality of first output means for selectively providing a first control signal thereat;

second signal generator means having a plurality of second output means for selectively providing a second control signal thereat;

a plurality of gate circuits arranged in an array having a predetermined number of horizontal and vertical rows, each of said gate circuits having charge storage diode means associated therewith coupled between said reference source means and at least one associated load of said plural loads and further having selectable control means having first and second inputs responsive to said first and second control signals, respectively, for controlling said associated charge storage diode means, each of said control means when selected forward biasing the diode means associated therewith and passing current therethrough in a forward direction to accumulate charge carriers therein, said reference source means being coupled through the low impedance charge carriers to at least said one of the loads associated with the gate circuit having the selected control means whenever the associated diode means thereof has charge carriers stored therein;

a plurality of first connecting means, each of said first connecting means commonly connecting the corresponding first inputs of the gate circuits of a mutually exclusive different one of said horizontal rows to a mutually exclusive different one of said first output means; and a plurality of second connecting means, each of said second connecting means commonly connecting the corresponding second inputs of the gate circuits of a mutually exclusive different one of said vertical rows to a mutually exclusive different one of said second output means;

the diode means of a gate circuit being forward biased and accumulating the charge carriers therein during the concurrent application of said first and second control signals to the first and second inputs of the control means of the particular gate circuit with which the diode means is associated, the diode means of a gate circuit being reverse biased and not accumulating charge carriers when at least one of the first and second signals is not applied to the respective one of the inputs of the control means of the gate circuit with which the diode means is associated.

33. A gate circuit system according to claim 32 wherein each of said selectable control means of said gate circuits further comprises:

first switching amplifier means coupled to said diode means for passing said forward current therethrough; and second switching amplifier means coupled to said diode means;

said first and second switching amplifier means having concurrent conducting and non-conducting states, respectively, when said diode means is accumulating charge carriers; and said first switching amplifier means having a non-conducting state and said second switching amplifier means having a concurrent predetermined one of conducting and non-conducting states when said diode means is not accumulating charge carriers, said conducting and non-conducting states of said second switching amplifier means providing and not providing, respectively, a discharge path for said charge carriers whenever said diode means has charge carriers stored therein.

34. A gate circuit system according to claim 33 wherein each of the first and second switching amplifier means further comprises a pair of first and second semiconductor elements, respectively, each of said semiconductor elements having a control input and two outputs associated therewith, said control inputs of said first and second elements comprising said first and second inputs, respectively, of said control means, one of said outputs of the first semiconductor element of the pair being connected to the control input of the second semiconductor element of the pair, the other of the outputs of the first semiconductor element of the pair being commonly connected to the one of the outputs of the second semiconductor element of the pair and the connection junction of the diode means and load associated with the particular pair, said first and second control signals being voltage and current control signals, respectively.

35. A gate circuit according to claim 34 wherein each of said loads has a selectable high and low impedance characteristics, said reference source means providing a current driver signal to a load when the diode means associated with the load is reverse biased and has charge carriers stored therein and the load has its selected low impedance characteristic, the current driver signal being passed through the associated diode means in a reverse direction.

36. Gate circuit apparatus according to claim 35 wherein said plurality of loads comprises a corresponding plurality of selection line means of a predetermined set of selection line means of a magnetic memory system.

37. Gate circuit apparatus according to claim 36 wherein said magnetic memory system is organized on a word line basis and is of the thin magnetic film storage element type, each of the selection line means of said plurality of selection line means comprising one of the word line conductors of said magnetic memory system.

38. In a magnetic memory system, the combination comprising:

a magnetic storage array having a plurality of selectable magnetic storage elements and a plurality selection line circuit means linking said storage elements in a predetermined manner, each of said selection line means having a normally high impedance characteristic and a selectable low impedance characteristic;

reference source means;

first signal generator means providing a first control signal;

second signal generator means providing a second control signal; and a plurality of gate circuits arranged in a predetermined second array, said second array having at least one row of at least two of said gate circuits, each of said gate circuits of said row having charge storage diode means associated therewith coupled between said reference source means and at least one associated selection line circuit means of said plurality of selection line circuit means, each of said gate circuits of said row further having selectable control means responsive to said first and second control signals for controlling the charge storage diode means associated therewith in reponse to said first and second control signals, each of said control means when selected forward biasing the diode means associated therewith and passing current therethrough in a forward direction to accumulate charge carriers therein, said reference source means being coupled through the low impedance charge carriers to at least said one of the plurality of selection line circuit means associated with the gate circuit having the selected control means whenever the associated diode means thereof has charge carriers stored therein;

at least one of said first and second control signals being applied simultaneously to the gate circuits of said row, the other of said control signals being selectively applied to the gate circuits of said row, the charge carriers being accumulated in the diode means of the selected gate circuit of said row when said first and second control signals are applied concurrently thereto, said reference source means providing a current driver signal in a reverse direction through the low impedance charge carrier path of the diode means of a selected gate circuit of said row and through the associated selection line circuit means selected to have a low impedance characteristic.

39. A memory system according to claim 38 wherein said plurality of selection line circuit means comprises a predetermined set of selection line means of said magnetic memory system.

40. A memory system according to claim 38 wherein said magnetic memory system is organized on a word line basis and is of the thin magnetic film storage element type, each of the selection line circuit means of said plurality of selection line circuit means comprising one of the word line conductors of said magnetic memory system and selectable current sink means serially coupled to the word line condutcor of the particular selection line circuit means.

41. A memory system according to claim 40 wherein said second array is coupled to a direct drive diode matrix, each of the selection line circuit means of said plurality of selection line circuit means further comprising one of the diodes of said direct drive diode matrix, each of said diodes of said matrix being in serially connecting relationship with the word line and current sink means associated with its selection line circuit means and the output of the gate circuit associated with its particular selection line circuit means.

42. A magnetic memory system according to claim 38 wherein each of said selectable control means of the gate circuits of said row further comprises:

first switching amplifier means coupled to said diode means for passing said forward current therethrough; and second switching amplifier means coupled to said diode means;

said first and second switching amplifier means having concurrent conducting and non-conducting states, respectively, when said diode means is accumulating charge carriers; and said first switching amplifier means having a non-conducting state and said second switching amplifier means having a concurrent predetermined one of conducting and non-conducting states when said diode means is not accumulating charge carriers, said conducting state of said second switching amplifier means providing a discharge path for said charge carriers whenever said diode means has charge carriers stored therein not previously discharged through the selected selection line circuit means associated therewith.

43. In a magnetic memory system, the combination comprising:

a magnetic storage array having a plurality of selectable magnetic storage elements and a plurality of selection line circuit means linking said storage elements in a predetermined manner, each of said selection line means having a normally high impedance characteristic and a selectable low impedance characteristic;

reference source means;

first signal generator means having a plurality of first output means for selectively providing a first control signal thereat;

second signal generator means having a plurality of second output means for selectively providing a second control signal thereat;

a plurality of gate circuits arranged in an array having a predetermined number of horizontal and vertical rows each of said gate circuits having charge storage diode means associated therewith coupled between said reference source means and at least one associated selection line circuit means of said plurality of selection line circuit means, each of said gate circuits further having selectable control means having first and second input responsive to said first and second control signals, respectively, for controlling said associated charge storage diode means, each of said control means when selected forward biasing the diode means associated therewith and passing current therethrough in a forward direction to accumulate charge carriers therein, said reference source means being coupled through the low impedance charge carriers to at least said one of the plurality of selection line circuits associated with the gate circuit having the selected control means whenever the associated diode means thereof has charge carriers stored therein;

a plurality of first connecting means, each of said first connecting means commonly connecting the corresponding first inputs of the gate circuits of a mutually exclusive different one of said horizontal rows to a mutually exclusive different one of said first output means; and a plurality of second connecting means, each of said second connecting means commonly connecting the corresponding second inputs of the gate circuits of a mutually exclusive different one of said vertical rows to a mutually exclusive different one of said second output means; the diode means of a gate circuit being forward biased and accumulating the charge carriers therein during the concurrent application of said first and second control signals to the first and second inputs of the control means of the particular gate circuit with which the diode means is associated, said reference source means providing a current driver signal in a reverse direction through the low impedance charge carrier path of the diode means of a selected gate circuit and through the associated selection line circuit means selected to have a low impedance characteristic.

44. A memory system according to claim 43 wherein said plurality of selection line circuit means comprises a predetermined set of selection line means of said magnetic memory system.

45. A memory system according to claim 43 wherein said magnetic memory system is organized on a word line basis and is of the thin magnetic film storage element type, each of the selection line circuit means of said plurality of selection line circuit means comprising one of the word line conductors of said magnetic memory system and selectable current sink means serially coupled to the word line conductor of the particular selection line circuit means.

46. A memory system according to claim 45 wherein said second array is coupled to a direct drive diode matrix, each of the selection line circuit means of said plurality of selection line circuit means further comprising one of of the diodes of said direct drive diode matrix, each of said diodes of said matrix being in serially connecting relationship with the word line and current sink means associated with its selection line circuit means and the output of the gate circuit associated with its particular selection line circuit means.

47. A magnetic memory system according to claim 43 wherein each of said selectable control means of the gate circuits of said row further comprises:

first switching amplifier means coupled to said diode means for passing said forward current therethrough; and second switching amplifier means coupled to said diode means;

said first and second switching amplifier means having concurrent conducting and non-conducting states, respectively, when said diode means is accumulating charge carriers; and said first switching amplifier means having a non-conducting state and said second switching amplifier means having a concurrent predetermined one of conducting and non-conducting states when said diode means is not accumulating charge carriers, said conducting state of said second switching amplifier means providing a discharge path for said charge carriers whenever said diode means has charge carriers stored therein not previously discharged through the selected selection line circuit means associated therewith.

References Cited

UNITED STATES PATENTS

| | | | |
|---|---|---|---|
| 3,356,998 | 12/1967 | Kaufman | 340—173 |
| 3,355,720 | 11/1967 | Kaufman | 340—173 |
| 3,184,605 | 5/1965 | Herzog | 307—319 |

JAMES W. MOFFITT, Primary Examiner

U.S. Cl. X.R.

307—319